(12) United States Patent
Ma et al.

(10) Patent No.: US 11,118,441 B2
(45) Date of Patent: *Sep. 14, 2021

(54) OPTIMIZED GEOSTEERING USING REAL-TIME GEOLOGICAL MODELS

(71) Applicant: HALLIBURTON ENERGY SERVICES, INC., Houston, TX (US)

(72) Inventors: Jin Ma, Singapore (SG); Rencheng Song, Singapore (SG); Glenn Andrew Wilson, Singapore (SG)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 337 days.

This patent is subject to a terminal disclaimer.

(21) Appl. No.: 16/200,898

(22) Filed: Nov. 27, 2018

(65) Prior Publication Data
US 2019/0093470 A1  Mar. 28, 2019

Related U.S. Application Data

(63) Continuation of application No. 15/324,511, filed as application No. PCT/US2016/016690 on Feb. 5, 2016, now Pat. No. 10,167,713.

(51) Int. Cl.
*E21B 44/00* (2006.01)
*E21B 7/04* (2006.01)
(Continued)

(52) U.S. Cl.
CPC .............. *E21B 44/00* (2013.01); *E21B 7/04* (2013.01); *E21B 41/0092* (2013.01);
(Continued)

(58) Field of Classification Search
CPC .... E21B 44/00; E21B 47/002; E21B 41/0092; E21B 47/022; E21B 49/00; E21B 7/04; G01V 1/282
See application file for complete search history.

(56) References Cited

U.S. PATENT DOCUMENTS 6,594,584 B1   7/2003   Omeragic et al.
6,885,942 B2   4/2005   Shray et al.
(Continued)

FOREIGN PATENT DOCUMENTS

WO   2014123509 A1   8/2014

OTHER PUBLICATIONS

Pitcher et al., "Advances in Geosteering Technology: From Simple to Complex Solutions" International Association of Drilling Contractors of the Society of Petroleum Engineers, IADC/SPE 128155, pp. 1-14 (Year: 2010).*

(Continued)

*Primary Examiner* — Rehana Perveen
*Assistant Examiner* — Steven W Crabb
(74) *Attorney, Agent, or Firm* — Polsinelli PC (57) ABSTRACT

Systems and methods for optimized geosteering include creating a parameter matrix, which comprises a formation property for each pair of true vertical depth (TVD) coordinates from a geological model and measured depth (MD) coordinates from a predefined well trajectory; updating the parameter matrix by replacing the TVD coordinates and the MD coordinates for each parameter entry in the parameter matrix with the TVD coordinates and the MD coordinates for an actual well trajectory; and compiling a distance to bed boundary (DTBB) array and one or more other logging while drilling (LWD) arrays using corresponding measurements at the MD coordinates of the actual well trajectory; and calculating a value for each parameter entry in the updated parameter matrix, which is a sum of a geology array, the DTBB array and the one or more other LWD arrays that are each multiplied by respectively assigned or calculated weights.

17 Claims, 9 Drawing Sheets

(51) Int. Cl.
  *E21B 47/002*   (2012.01)
  *E21B 41/00*    (2006.01)
  *E21B 47/022*   (2012.01)
  *E21B 49/00*    (2006.01)
  *G01V 1/28*     (2006.01)

(52) U.S. Cl.
  CPC .......... *E21B 47/002* (2020.05); *E21B 47/022* (2013.01); *E21B 49/00* (2013.01); *G01V 1/282* (2013.01)

(56) References Cited

U.S. PATENT DOCUMENTS

| | | |
|---|---|---|
| 7,630,872 B2 | 12/2009 | Xia et al. |
| 7,684,929 B2 | 3/2010 | Prange et al. |
| 8,442,769 B2 | 5/2013 | Phillips et al. |
| 9,103,936 B2 | 8/2015 | Calleja et al. |
| 2005/0171698 A1 | 8/2005 | Sung et al. |
| 2007/0168133 A1 | 7/2007 | Bennett et al. |
| 2015/0134255 A1* | 5/2015 | Zhang ................. G01V 99/005 702/7 |
| 2015/0292266 A1 | 10/2015 | Johnson et al. |

OTHER PUBLICATIONS

International Search Report and Written Opinion; PCT Application No. PCT/US2016/016690; dated Oct. 27, 2016.

Omeragic et al., 3D Reservoir Characterization and Well Placement in Complex Scenarios Using Azimuthal Measurements While Drilling, SPWLA 50th Annual Logging Symposium, Jun. 21-24, 2009, (16 pages).

Wilson et al, Generating An Earth Model From Spatial Correlations of Equivalent Earth Models—Halliburton Energy Services, Inc. Invention Disclosure dated Mar. 27, 2014, (15 pages).

Song et al, Methods of Selecting an Earth Model From a Plurality of Equivalent Earth Models—Halliburton Energy Services, Inc. Invention Disclosure dated Mar. 27, 2014, 18 pages.

Sviridov et al, New Software for Processing of LWD Extradeep Resistivity and Azimuthal Resistivity Data, SPE Reservoir Evaluation & Engineering, May 2014, pp. 109-127.

Seydoux et al., Full 3D Deep Directional Resistivity Measurements Optimize Well Placement and Provide Reservoir-Scale Imaging While Drilling, SPWLA 55th Annual Logging Symposium, May 18-22, 2014, 14 pages.

International Preliminary Report on Patentability; PCT Application No. PCT/US2016/016690; dated Aug. 16, 2018.

* cited by examiner

OPTIMIZED GEOSTEERING USING REAL-TIME GEOLOGICAL MODELS

CROSS-REFERENCE TO RELATED APPLICATIONS

This application is a continuation of U.S. application Ser. No. 15/324,511, filed Jan. 6, 2017, which is the national stage entry of PCT/US2016/016690 filed Feb. 5, 2016, each of the aforementioned application is expressly incorporated herein in its entirety.

FIELD OF THE DISCLOSURE

The present disclosure generally relates to systems and methods for optimized geosteering using real-time geological models. More particularly, the present disclosure relates to optimized geosteering using real-time geological models that are updated with LWD measurements containing data such as, for example, layer boundaries and formation properties.

BACKGROUND

Geosteering solutions are very important for optimizing well placement while drilling, especially for landing the reservoir or drilling through the reservoir. Conventional geosteering is usually based on a geological model constructed from seismic imaging and offset well logs.

Figures 1, 2A, 2B:
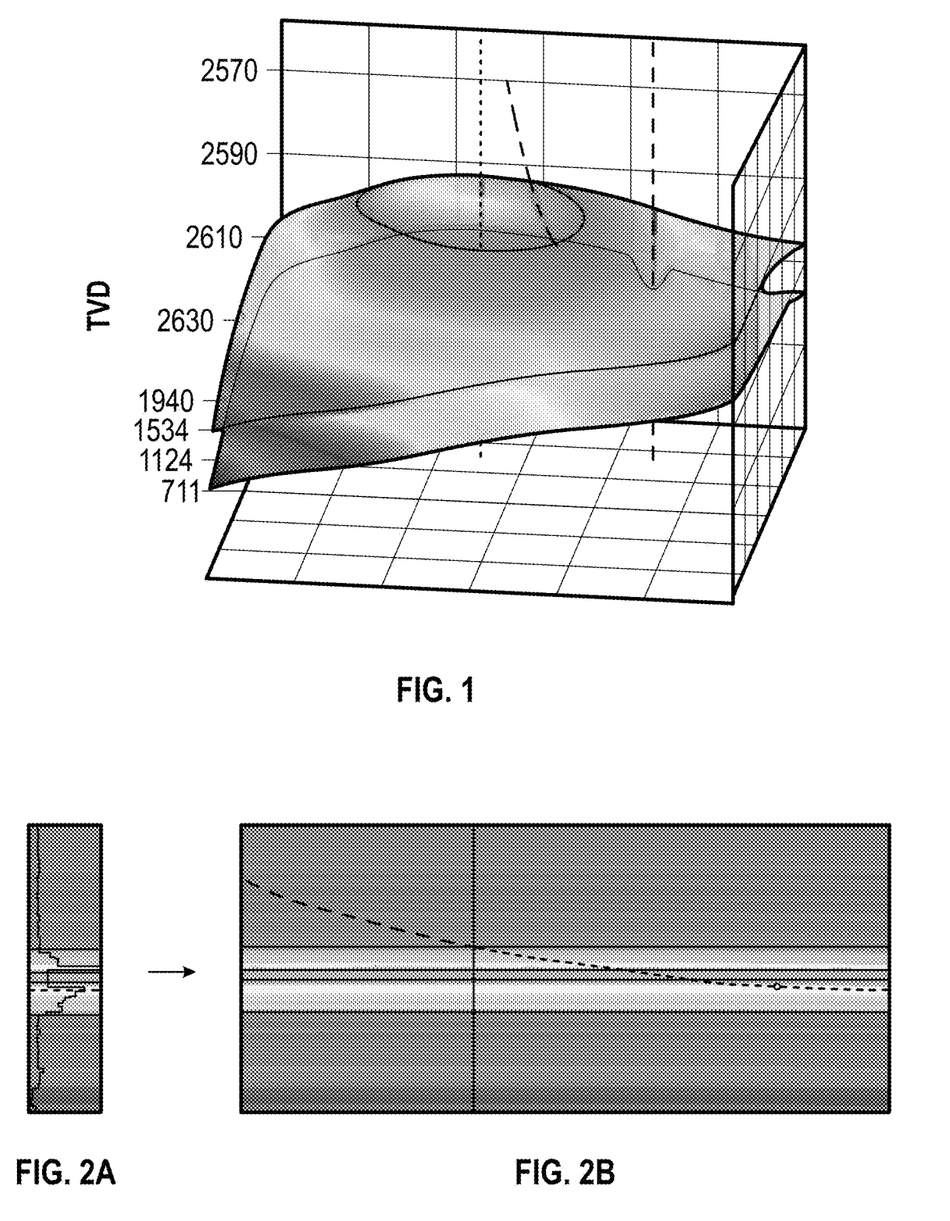
FIG. 1 is a seismic image illustrating formation surfaces interpreted from seismic data.
FIG. 2A is an offset well resistivity log.
FIG. 2B is an image of a pre-well, geological model predicted using the offset well resistivity log in FIG. 2A.

Geophysical data, such as seismic images, are used to identify the geological structure. Depending on the acquisition methodology, seismic data can be used to image coarse to fine scale structures. In FIG. 1, for example, a surface seismic image is used to image formation surfaces, which are interpreted from the seismic data, at frequencies typically between 2.5 Hz and 200 Hz and provide a resolution on the order of 10 m. This may be adequate for field-scale exploration and appraisal, but is coarse for reservoir-scale appraisal and production. Resolution can be improved using well known borehole seismic methods.

Vertical offset wells are commonly drilled to provide stratigraphic information from mud and well-logging, such as acoustic, resistivity, nuclear magnetic resonance, and fluid sampling tools. This type of geophysical data may be acquired during logging while drilling (LWD) operations, or after with wireline tools. Seismic data and thus, structural models, can be correlated with acoustic logging data in a well-tying process. In FIG. 2A, for example, an offset well resistivity log is used to generate the predicted, pre-well, geological model in FIG. 2B. The physical properties of layers may be correlated to seismic structure, adding sub-seismic stratigraphy to the structural model and populating the 3D structural model. Multiple wells may be used to geostatistically populate the properties of the structural model.

Based on the foregoing techniques for constructing a 3D geological model, well placement can be designed and optimized. For example, well placement and completion designs can be simulated for reservoir history-matched production with reservoir simulators. In reality, however, the 3D geological model may contain uncertainties that interfere with accurate well placement and/or planning. Such uncertainties may include, for example: i) sub-seismic resolution stratigraphy; and ii) lack of continuity of stratigraphy between adjacent wells. For this reason, geosteering enables well placement to be adjusted in real-time during drilling operations.

Current, real-time geosteering techniques can image formation properties by inverting resistivity data for layered earth (1D) resistivity models. One such technique uses distance to bed boundary (DTBB) inversion from deep LWD resistivity measurements to produce a "curtain plot," which is a simple visualization of stitched layered earth (1D) resistivity models that can be interpreted for geological structure and geosteering decisions. Similar to the geological models described above, curtain plots contain uncertainties. Such uncertainties may include, for example: i) a lack of 2D and 3D model complexity at each measured depth because the earth model is assumed to be locally 1D; and ii) non-unique resistivity inversion, implying multiple earth models may satisfy the same resistivity data. A curtain plot captures a possible solution, and reconciling differences between the curtain plot and the geological model (especially in the absence of other LWD data) is a common challenge in geo steering.

BRIEF DESCRIPTION OF THE DRAWINGS

The present disclosure is described below with references to the accompanying drawings in which like elements are referenced with like reference numerals, and in which.

DETAILED DESCRIPTION OF THE PREFERRED EMBODIMENTS

The present disclosure overcomes one or more deficiencies in the prior art by providing systems and methods for optimized geosteering using real-time geological models that are updated with LWD measurements containing data such as, for example, layer boundaries and formation properties.

In one embodiment, the present disclosure includes a method for optimized geosteering using real time geological models, which comprises: a) creating a parameter matrix, which comprises a formation property for each pair of TVD coordinates from a geological model and MD coordinates from a predefined well trajectory; b) initializing the parameter matrix by initializing a value for each parameter entry in the parameter matrix; c) updating the initialized parameter matrix by replacing the TVD coordinates and the MD coordinates for each parameter entry in the parameter matrix with the TVD coordinates and the MD coordinates for an actual well trajectory; d) compiling a DTBB array and one or more other LWD arrays using corresponding measurements at the MD coordinates of the actual well trajectory; e) calculating a value for each parameter entry in the updated parameter matrix, which is a sum of a geology array, the DTBB array and the one or more other LWD arrays that are each multiplied by one of (i) respectively assigned weights when the TVD coordinates and the MD coordinates for each parameter entry in the updated parameter matrix are not located within the stratigraphic boundaries of the DTBB array and the one or more other LWD arrays; and (ii) respectively calculated weights when the TVD coordinates and the MD coordinates for each parameter entry in the updated parameter matrix are located within the stratigraphic boundaries of the DTBB array and the one or more other LWD arrays; and f) updating the geological model in real time during drilling operations by using a computer processor to replace each initialized value for each parameter entry in the updated parameter matrix with the respective calculated value.

In another embodiment, the present disclosure includes a non-transitory program carrier device tangibly carrying computer executable instructions for optimized geosteering using real time geological models, the instructions being executable to implement: a) creating a parameter matrix, which comprises a formation property for each pair of TVD coordinates from a geological model and MD coordinates from a predefined well trajectory; b) initializing the parameter matrix by initializing a value for each parameter entry in the parameter matrix; c) updating the initialized parameter matrix by replacing the TVD coordinates and the MD coordinates for each parameter entry in the parameter matrix with the TVD coordinates and the MD coordinates for an actual well trajectory; d) compiling a DTBB array and one or more other LWD arrays using corresponding measurements at the MD coordinates of the actual well trajectory; e) calculating a value for each parameter entry in the updated parameter matrix, which is a sum of a geology array, the DTBB array and the one or more other LWD arrays that are each multiplied by one of (i) respectively assigned weights when the TVD coordinates and the MD coordinates for each parameter entry in the updated parameter matrix are not located within the stratigraphic boundaries of the DTBB array and the one or more other LWD arrays; and (ii) respectively calculated weights when the TVD coordinates and the MD coordinates for each parameter entry in the updated parameter matrix are located within the stratigraphic boundaries of the DTBB array and the one or more other LWD arrays; and f) updating the geological model in real time during drilling operations by replacing each initialized value for each parameter entry in the updated parameter matrix with the respective calculated value.

In yet another embodiment, the present disclosure includes a non-transitory program carrier device tangibly carrying computer executable instructions for optimized geosteering using real time geological models, the instructions being executable to implement: a) creating a parameter matrix, which comprises a formation property for each pair of TVD coordinates from a geological model and MD coordinates from a predefined well trajectory; b) initializing the parameter matrix by initializing a value for each parameter entry in the parameter matrix; c) updating the initialized parameter matrix by replacing the TVD coordinates and the MD coordinates for each parameter entry in the parameter matrix with the TVD coordinates and the MD coordinates for an actual well trajectory; d) compiling a DTBB array and one or more other LWD arrays using corresponding measurements at the MD coordinates of the actual well trajectory; e) calculating a value for each parameter entry in the updated parameter matrix, which is a sum of a geology array, the DTBB array and the one or more other LWD arrays that are each multiplied by respective weights.

The subject matter of the present disclosure is described with specificity, however, the description itself is not intended to limit the scope of the disclosure. The subject matter thus, might also be embodied in other ways, to include different structures, steps and/or combinations similar to and/or fewer than those described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order. While the present disclosure describes systems and methods for use with LWD tools and geosteering, such systems and methods may also be used for wireline imaging and reservoir monitoring imaging (e.g., with a reservoir model).

Method Description

Figure 3A:
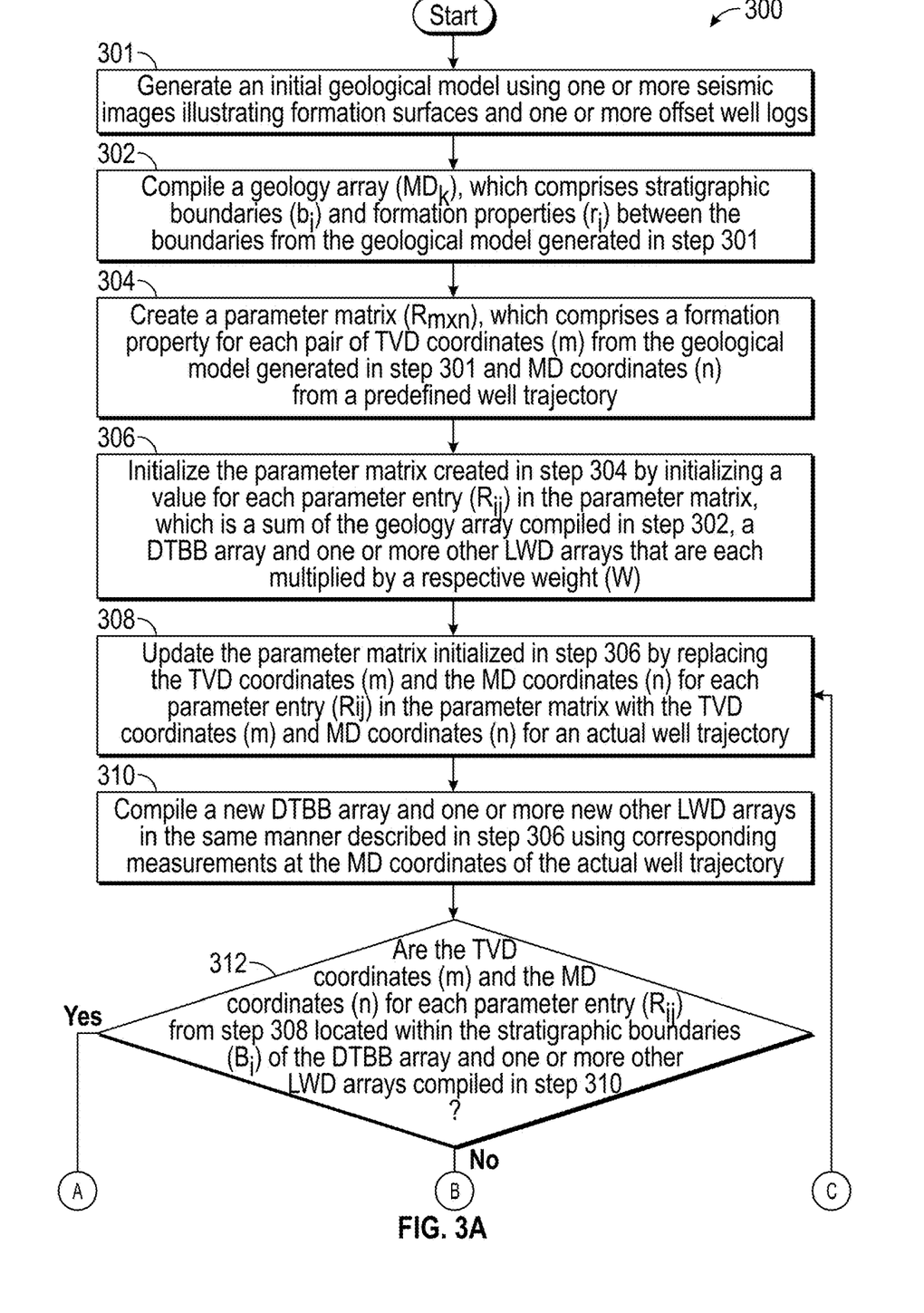
FIGS. 3A-3B are a flow diagram illustrating one embodiment of a method for implementing the present disclosure.
Figure 3B:
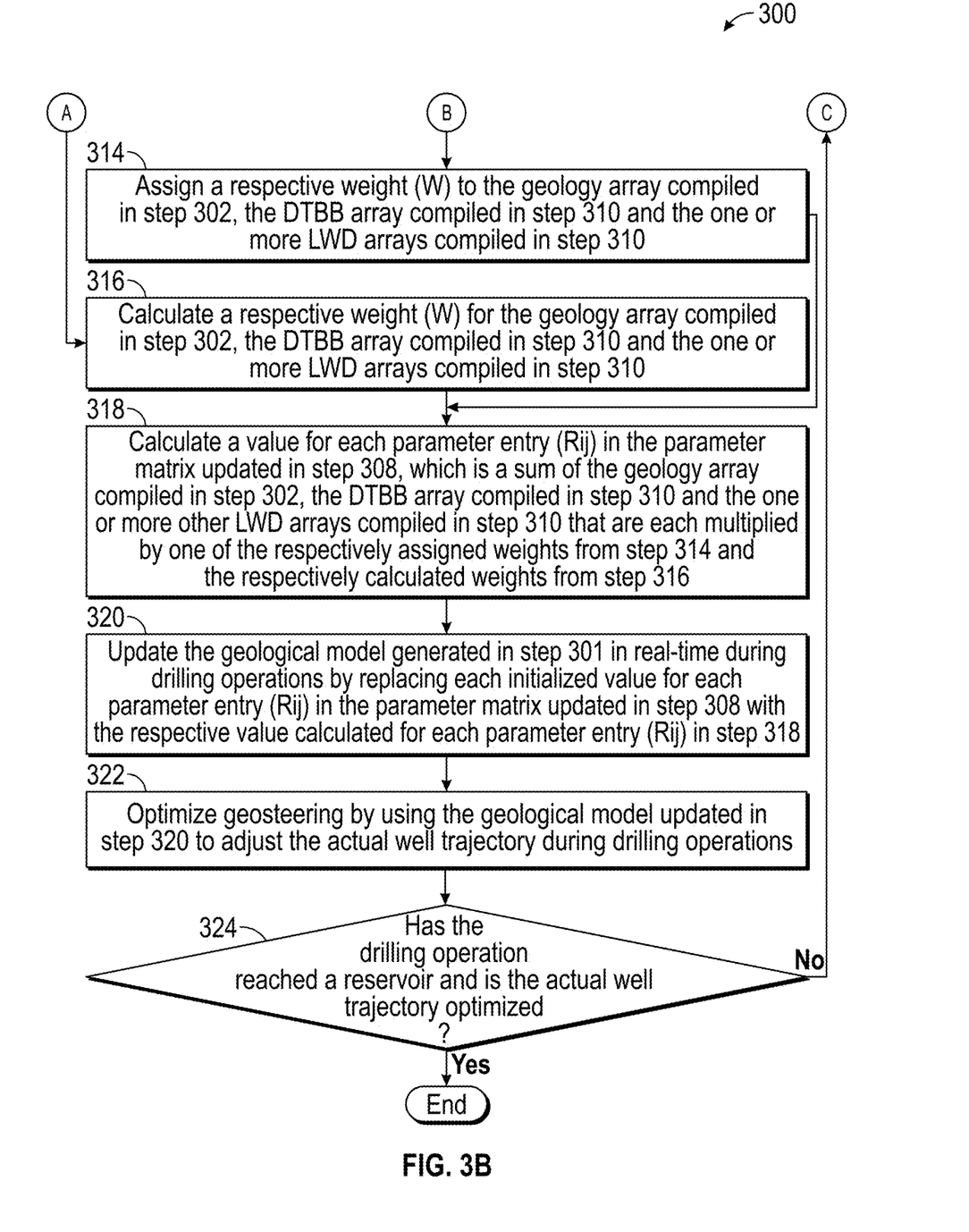

Referring now to FIGS. 3A-3B, a flow diagram illustrates one embodiment of a method 300 for implementing the present disclosure. The method 300 is performed during drilling operations and optimizes geosteering using real-time geological models that are updated (reconciled) during the drilling operations in a manner that enables simultaneous visualization and reconciliation between geological models without providing bias of one over the other.

Figure 4:
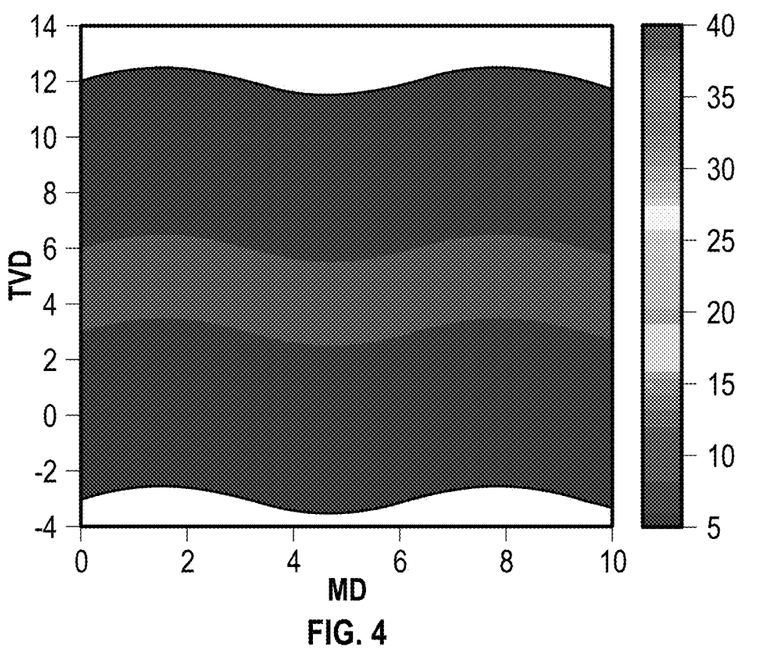
FIG. 4 is an image of a geological model illustrating resistivity.
Figure 5A:
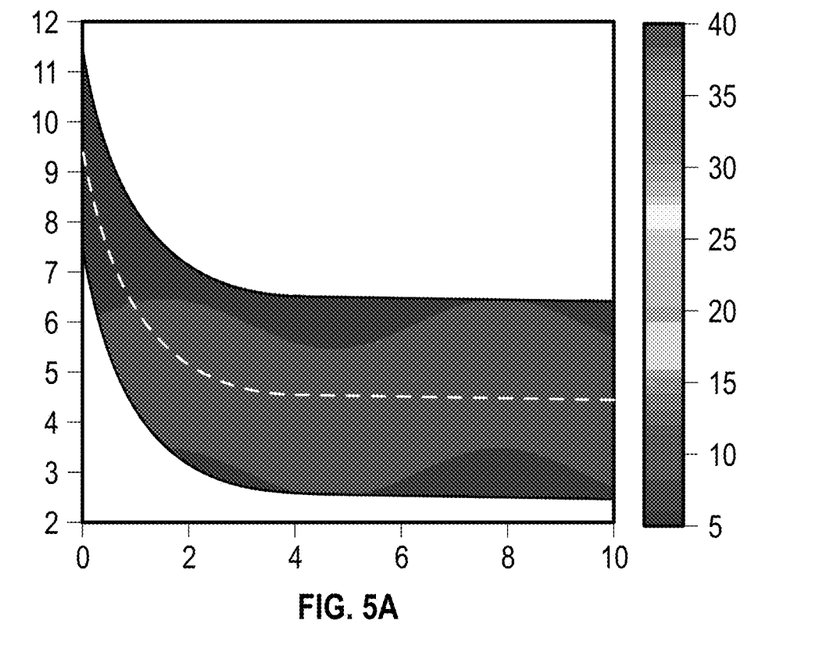
FIGS. 5A-5B are different images of DTBB resistivity inversion of a geological model commonly referred to as curtain plots.
Figure 5B:
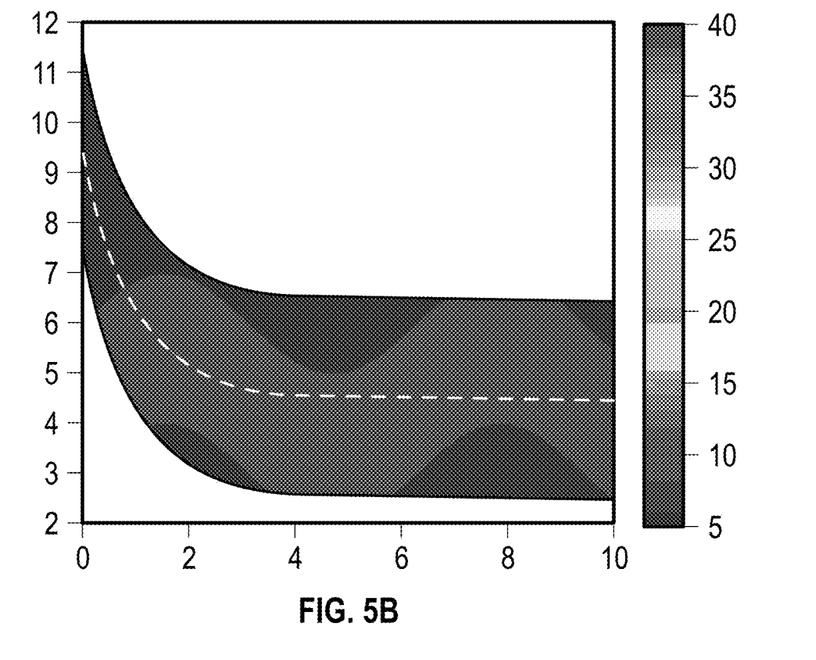

In step 301, an initial geological model is generated using one or more seismic images illustrating formation surfaces like that in FIG. 1, one or more offset well logs like that in FIG. 2A and/or techniques well known in the art. In FIG. 4, for example, a geological model illustrates an attribute (e.g. resistivity). The y-axis represents true vertical depth (TVD), the x-axis represents measured depth (MD) and the shaded bar to the right represents the formation resistivity. Because FIG. 4 is just an example, the unit of each axis is not specified. The units for TVD and MD can be feet, meters, or kilometers. By inverting the resistivity data for the geological model using DTBB inversion, a curtain plot of the geological model may be produced as illustrated in FIGS. 5A-5B. Each curtain plot in FIGS. 5A-5B is different and based on an exemplary illustration of DTBB inversion results. A predefined well trajectory can be superimposed on each curtain plot as illustrated by the dashed line in FIGS. 5A-5B. For convenience and to avoid bias, the curtain plot may be cropped around the well trajectory to a depth of investigation (DOI) as illustrated in FIGS. 5A-5B. If the DTBB inversion agrees well with the geological model (FIG. 4), then the curtain plot may be acceptable as illustrated by FIG. 5A. DTBB inversion, however, rarely (if ever) agrees with (matches) the geological model (FIG. 4) as illustrated by FIG. 5B. In this event, there is a need to reconcile the two images, since either image would lead to different geosteering decisions. Although the illustrations herein use resistivity values as an example, values may be used for other attributes such as density, porosity, saturation and other characteristics of the formation. Similarly, the geological model may be updated in terms of density, porosity and other characteristics of the formation.

In step 302, a geology array ($MD_k$) is compiled, which comprises stratigraphic boundaries ($b_i$) and formation properties ($r_i$) (e.g. resistivity) between the boundaries from the geological model generated in step 301. The measured depth (MD) coordinates for each entry are determined by a predefined well trajectory. At one measured depth in the geological model, the stratigraphic boundaries ($b_i$) and formation properties ($r_i$) can be extracted and compiled as the following array:

$$\text{Geo log } y(MD_k) = \begin{bmatrix} b_1 & r_1 \\ b_2 & r_2 \\ \vdots & \vdots \\ b_{N-1} & r_{N-1} \\ b_N & r_N \end{bmatrix}, \quad (1)$$

wherein i=1, 2, . . . , N represents the ith layer from the geological model and N is the total number of layers. Here, $b_1$ or $b_N$ may be a boundary at infinity for the outermost layer with infinite thickness.

In step 304, a parameter matrix ($R_{m \times n}$) is created, which comprises a formation property for each pair of TVD coordinates (m) from the geological model generated in step 301 and MD coordinates (n) from the predefined well trajectory used in step 302. There are m discrete points along the TVD axis and n measured points along the MD axis.

In step 306, the parameter matrix created in step 304 is initialized by initializing a value for each parameter entry ($R_{ij}$) in the parameter matrix, which is a sum of the geology array compiled in step 302, a DTBB array and one or more other LWD arrays that are each multiplied by a respective weight (W). Each array has the same measured depth (MD) as the parameter matrix. The DTBB array and the one or more other LWD arrays may be compiled in the same manner and at the same measured depth (MD) as the geology array compiled in step 302. These arrays may be represented as:

$$DTBB(MD_k) = \begin{bmatrix} B_1 & R_1 \\ B_2 & R_2 \\ \vdots & \vdots \\ B_{N-1} & R_{N-1} \\ B_N & R_N \end{bmatrix}, \quad (2)$$

$$other(MD_k) = \begin{bmatrix} B_{other1} & R_{other1} \\ B_{other2} & R_{other2} \\ \vdots & \vdots \\ B_{otherN-1} & R_{otherN-1} \\ B_{otherN} & R_{otherN} \end{bmatrix}, \quad (3)$$

wherein each array comprises stratigraphic boundaries ($B_i$) and formation properties ($R_i$) (e.g. resistivity) between the boundaries from deep (DTBB array) and shallow (other LWD arrays) measurements of the formation properties. The shallow measurements come from other LWD tools (e.g. Azimuthal Focused Resistivity and At Bit Resistivity), which normally provide shallow resistivity measurements. From the geology array compiled in step 302, the DTBB array and the one or more other LWD arrays, all the layer boundaries and resistivity profiles are explicitly represented for each measured depth. Initializing the value for each parameter entry ($R_{ij}$) in the parameter matrix therefore, may be expressed by the following equation:

$$R_{total} = W_{geology} \times R_{geology} + W_{DTBB} \times R_{DTBB} + W_{other} \times R_{other}, \quad (4)$$

wherein $W_{geology}$, $W_{DTBB}$ and $W_{other}$ are the respective weights and $$W_{geology} + W_{DTBB} + W_{other} = 1, 0 \leq W_k \leq 1. \quad (5)$$

For each entry in the parameter matrix, if its TVD exists exclusively only in the stratigraphic boundaries ($B_i$) of a single array (e.g. geology array), then the initialized value is determined only by the formation property ($R_i$) entries for that array because its weight ($W_{geology}$) in equation (4) is equal to 1 and the other arrays in equation (4) are assigned a weight of 0. If, however, the TVD for a parameter entry exists in the stratigraphic boundaries ($B_i$) of each array in equation (4), then the initialized value is determined by using equations (5), (6) and (7), to calculate $W_{other}$, $W_{geology}$ and $W_{DTBB}$ used in equation (4). $R_{geology}$, $R_{DTBB}$ and $R_{other}$ may include any formation property such as resistivity, density or porosity interpreted from different tool logs within the same MD range. The last two terms in equation (4) depend on the DOI, meaning the correlation of different tool logs should always be within the DOI.

In step 308, the parameter matrix initialized in step 306 is updated by replacing the TVD coordinates (m) and the MD coordinates (n) for each parameter entry ($R_{ij}$) in the parameter matrix with the TVD coordinates (m) and MD coordinates (n) for an actual well trajectory.

In step 310, a new DTBB array and one or more new other LWD arrays are compiled, which are compiled in the same manner described in step 306 using corresponding measurements at the MD coordinates of the actual well trajectory.

In step 312, the method 300 determines if the TVD coordinates (m) and the MD coordinates (n) for each parameter entry ($R_{ij}$) from step 308 are located within the stratigraphic boundaries ($B_i$) of the DTBB array and one or more other LWD arrays compiled in step 310. If the TVD coordinates (m) and the MD coordinates (n) for each parameter entry ($R_{ij}$) are not located within the stratigraphic boundaries ($B_i$) of the DTBB array and one or more other LWD arrays, then the method 300 proceeds to step 314. Otherwise, the method 300 proceeds to step 316.

In step 314, a respective weight (W) is assigned to the geology array compiled in step 302, the DTBB array compiled in step 310 and the one or more LWD arrays compiled in step 310.

In step 316, a respective weight (W) is calculated for the geology array compiled in step 302, the DTBB array compiled in step 310 and the one or more LWD arrays compiled in step 310. The weights are determined by the confidence in the source of the measurement of the formation property. In one embodiment, the weights for the geology array and the DTBB array can be determined by:

$$W_{geology} = \frac{C_{geology}}{\text{Residual}} = \frac{C_{geology}}{\|V_{geology} - V_{actual}\|} \quad (6)$$

$$W_{DTBB} = \frac{C_{DTBB}}{\text{Residual}} = \frac{C_{DTBB}}{\|V_{DTBB} - V_{actual}\|} \quad (7)$$

wherein $C_{geology}$ and $C_{DTBB}$ are constant factors that make equations (6) and (7) satisfy equation (5). $V_{geology}$ is the forward modeling response based on a predicted geology model, $V_{DTBB}$ is the forward modeling response based on a DTBB model, and $V_{actual}$ is the actual measured tool response for the formation property. The residual is defined as the difference between the forward modeling responses (geology/DTBB/other tool) and the tool response for the formation property. In one embodiment, $W_{geology}$ and $W_{DTBB}$ are defined as a negative correlation to the residual. For example, if the residual for the DTBB model is smaller than the geology model, it means that the calculated model response $V_{DTBB}$ matches better with the real formation properties than $V_{geology}$, so that the weight for DTBB ($W_{DTBB}$) should be assigned a larger value because the DTBB model is closer to the formation property.

In step 318, a value is calculated for each parameter entry ($R_{ij}$) in the parameter matrix updated in step 308, which is a sum of the geology array compiled in step 302, the DTBB array compiled in step 310 and the one or more other LWD arrays compiled in step 310 that are each multiplied by one of the respectively assigned weights from step 314 and the respectively calculated weights from step 316 using equation (4). Other algorithms (e.g. higher order interpolations) or petrophysical laws, however, may be utilized to calculate the value for each parameter entry ($R_{ij}$).

Figure 6A:
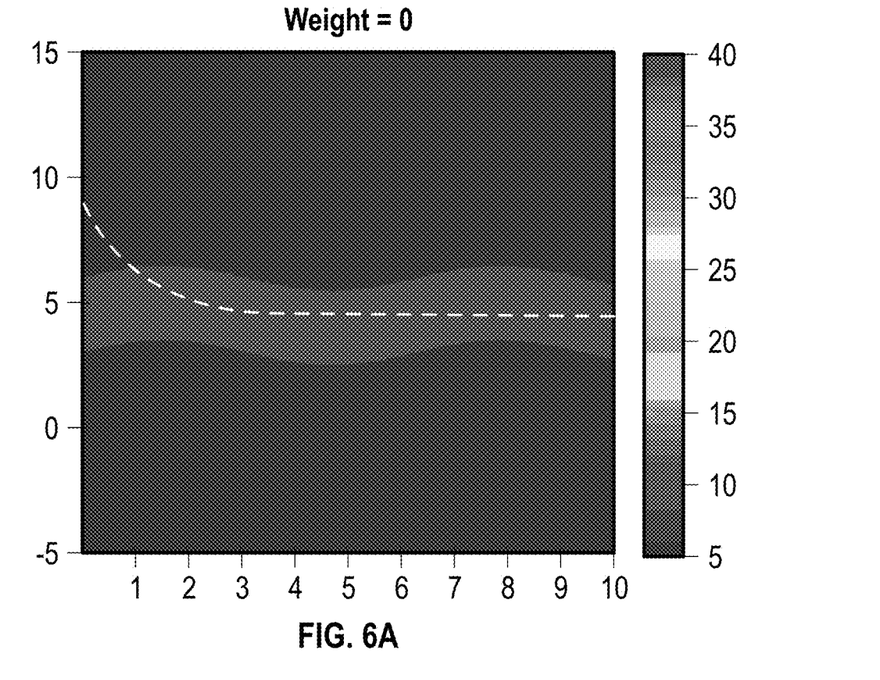
FIGS. 6A-6D are images of updated geological models illustrating the result of step 320 in FIG. 3B using different weights in step 318.
Figure 6B:
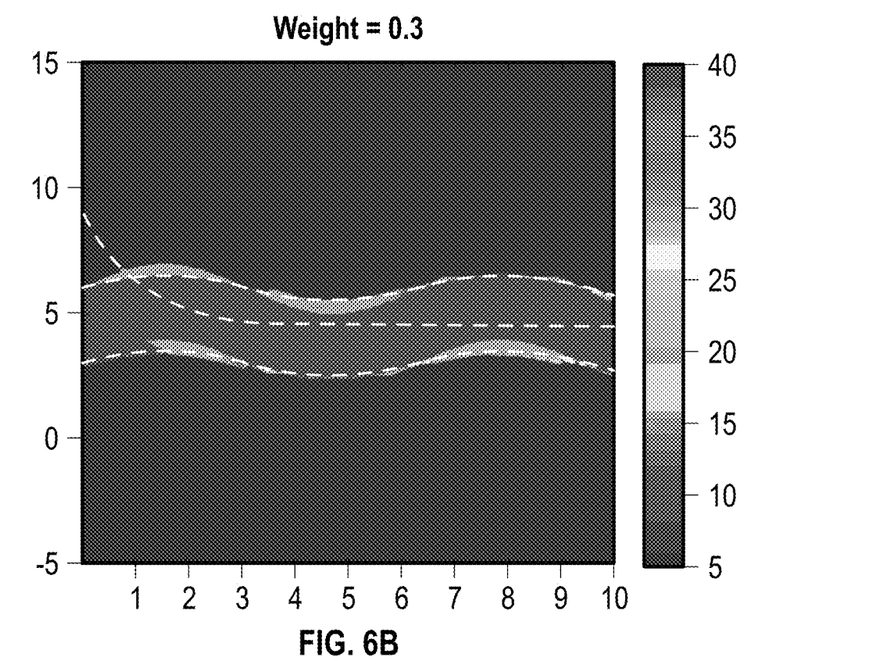
Figure 6C:
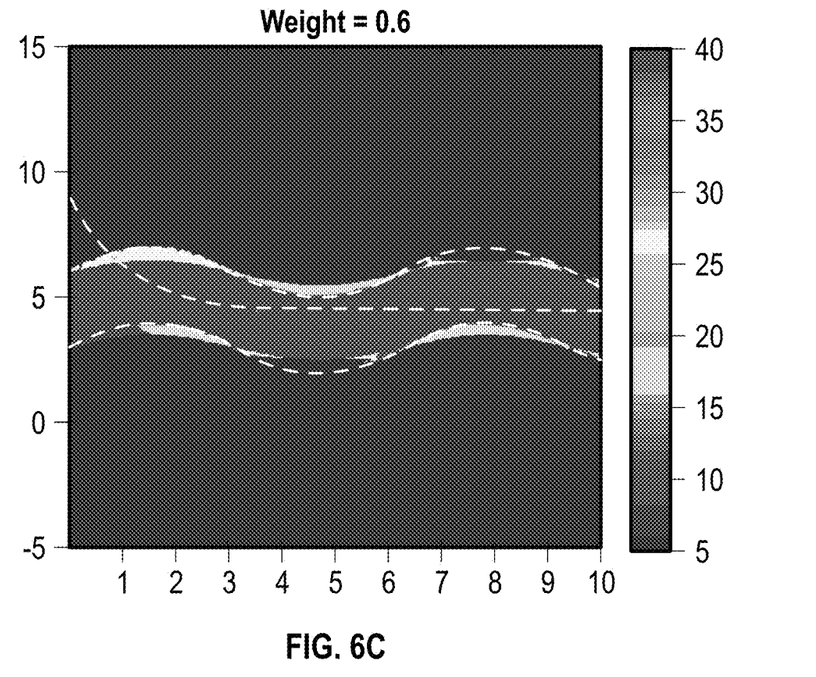
Figure 6D:
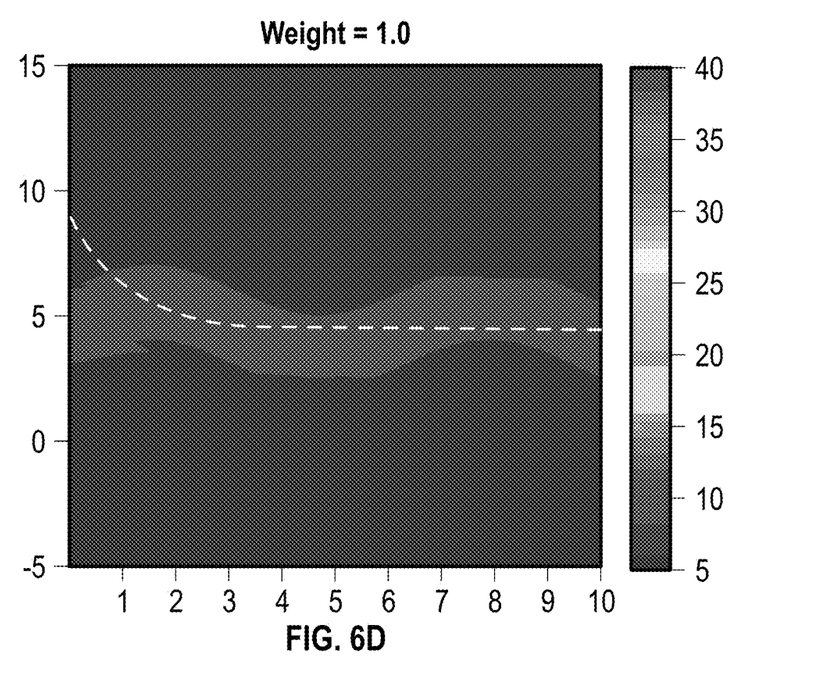
Figure 7:
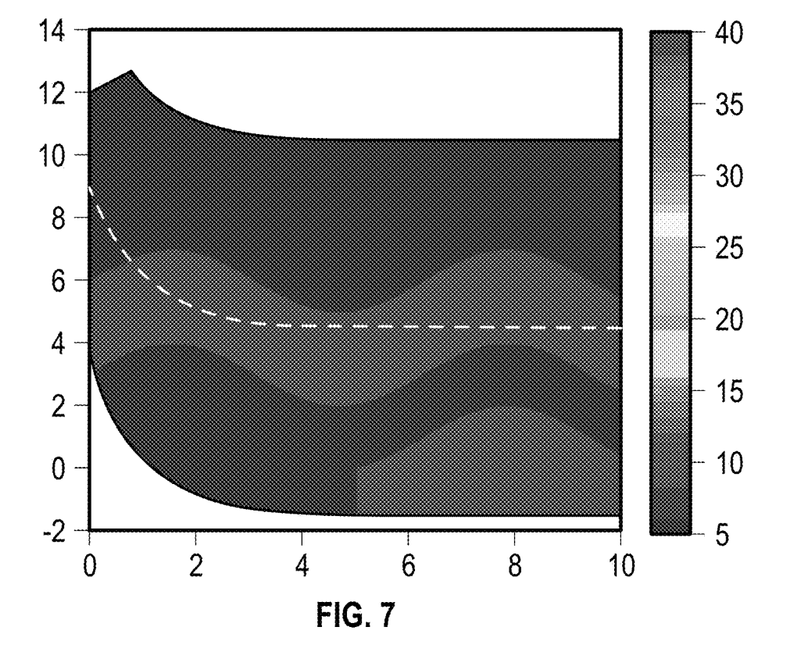
FIG. 7 is a curtain plot of the geological model illustrated in FIG. 4
Figure 8A:
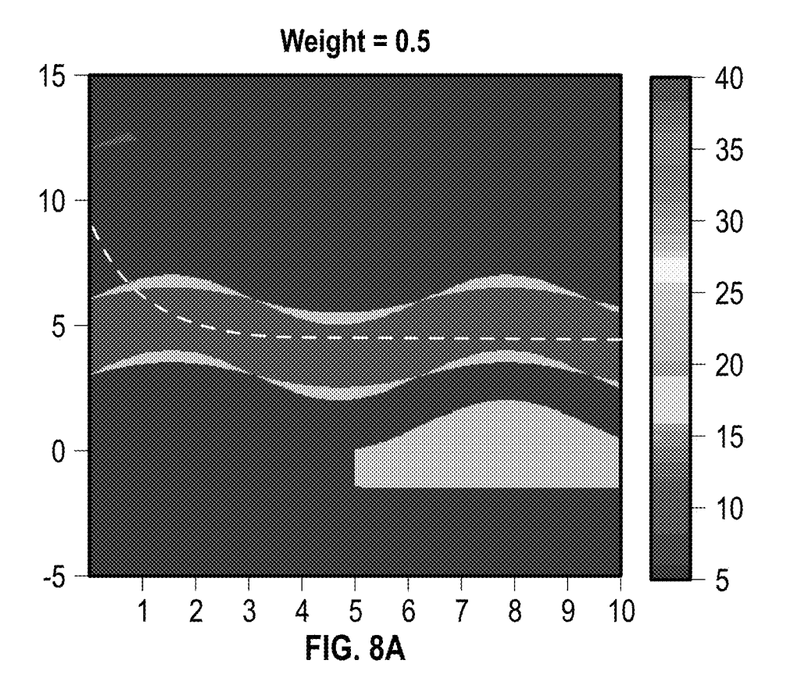
FIGS. 8A-8B are additional images of updated geological models illustrating the result of step 320 in FIG. 3B using different weights in step 318.
Figure 8B:
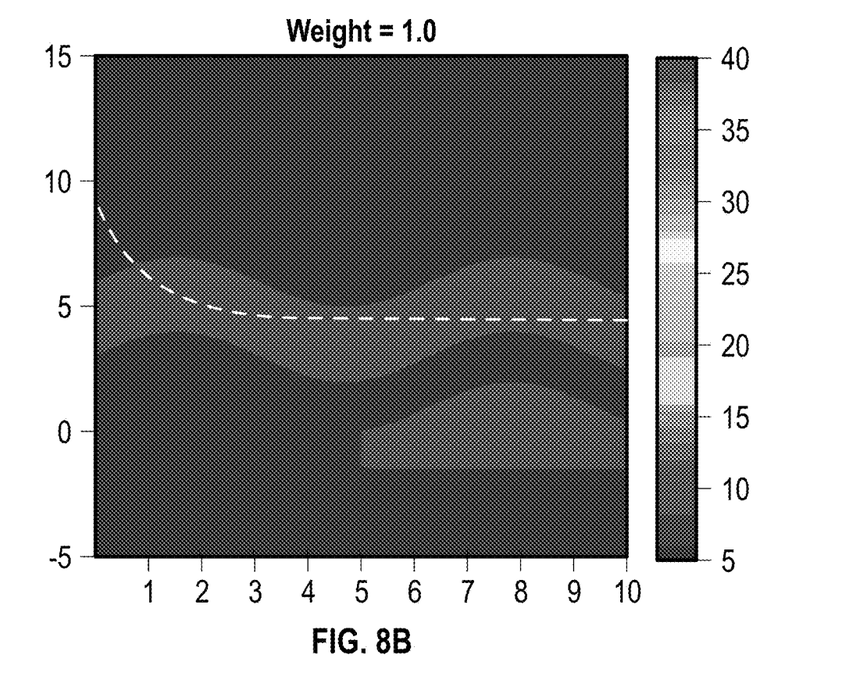

In step 320, the geological model generated in step 301 is updated in real-time during drilling operations by replacing each initialized value for each parameter entry ($R_{ij}$) in the parameter matrix updated in step 308 with the respective value calculated for each parameter entry ($R_{ij}$) in step 318. Each respective value calculated for each parameter entry ($R_{ij}$) in step 318 represents a value for a pixel in an image of the geological model. In FIGS. 6A-6D, images of an updated geological model illustrate the result of this step using different respective weights for the DTBB array in step 318 to update the geological model illustrated in FIG. 4. In each image, the y-axis represents true vertical depth (TVD), the x-axis represents measured depth (MD) and the shaded bar to the right represents the formation resistivity. Because FIGS. 6A-6D represent examples, the unit of each axis is not specified. The units for TVD and MD can be feet, meters, or kilometers. A real-time well trajectory is superimposed on each image as illustrated by the dashed line in FIGS. 6A-6D. As shown by the images, some of the results have added more features to the reservoir layer. In FIG. 6A, the image of the updated geological model is still the geological model illustrated in FIG. 4 because the weight is set to 0. In FIG. 6B, the image of the updated geological model illustrates resistivity values within the reservoir layer that are updated and a preserved boundary of the geology layer when the weight is set to 0.3. In FIG. 6C, the image of the updated geological model illustrates an updated boundary of the geology layer when the weight is set to 0.6. In FIG. 6D, the image of the updated geological model illustrates all the features updated when the weight is set to 1. For deep LWD resistivity measurements, the DOI may be much larger (e.g., between 30 and 100 ft.), as illustrated in FIG. 7 by the curtain plot of the geological model illustrated in FIG. 4. In FIGS. 8A-8B, images of an updated geological model illustrate the result of this step using different respective weights for the DTBB array in step 318 to update the geological model illustrated in FIG. 7. In each image, the y-axis represents true vertical depth (TVD), the x-axis represents measured depth (MD) and the shaded bar to the right represents the formation resistivity. Because FIGS. 8A-8B represent examples, the unit of each axis is not specified. The units for TVD and MD can be feet, meters, or kilometers. A real-time well trajectory is superimposed on each image as illustrated by the dashed line in FIGS. 8A-8B. In FIGS. 8A-8B, an extra truncated reservoir may be detected beneath the predicted reservoir layer. Thus, the resistivity inversion results provide extra valuable information other than predicted reservoirs.

In step 322, geosteering is optimized by using the geological model updated in step 320 to adjust the actual well trajectory during the drilling operations.

In step 324, the method 300 determines if the drilling operations have reached a reservoir and if the actual well trajectory is optimized such as, for example, to maintain the actual well trajectory in predetermined areas of a reservoir that maximize production from the reservoir. If the drilling operations have not reached a reservoir or the actual well trajectory is not optimized, then the method 300 returns to step 308. Otherwise, the method 300 ends. The method 300 reconciles the differences between different measurement resources (geology array, DTBB array and other LWD arrays) to update the geological model in real-time with higher resolution and more confidence. As a result, geosteering is optimized using the updated geological model to adjust the actual well trajectory during the drilling operations.

System Description

The present disclosure may be implemented through a computer-executable program of instructions, such as program s, generally referred to as software applications or application programs executed by a computer. The software may include, for example, routines, programs, objects, components and data structures that perform particular tasks or implement particular abstract data types. The software forms an interface to allow a computer to react according to a source of input. DecisionSpace®, which is a commercial software application marketed by Landmark Graphics Corporation, may be used as an interface application to implement the present disclosure. The software may also cooperate with other code segments to initiate a variety of tasks in response to data received in conjunction with the source of the received data. The software may be stored and/or carried on any variety of memory such as CD-ROM, magnetic disk, bubble memory and semiconductor memory (e.g. various types of RAM or ROM). Furthermore, the software and its results may be transmitted over a variety of carrier media such as optical fiber, metallic wire and/or through any of a variety of networks, such as the Internet.

Moreover, those skilled in the art will appreciate that the disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof, in a computer system or other processing system.

Figure 9:
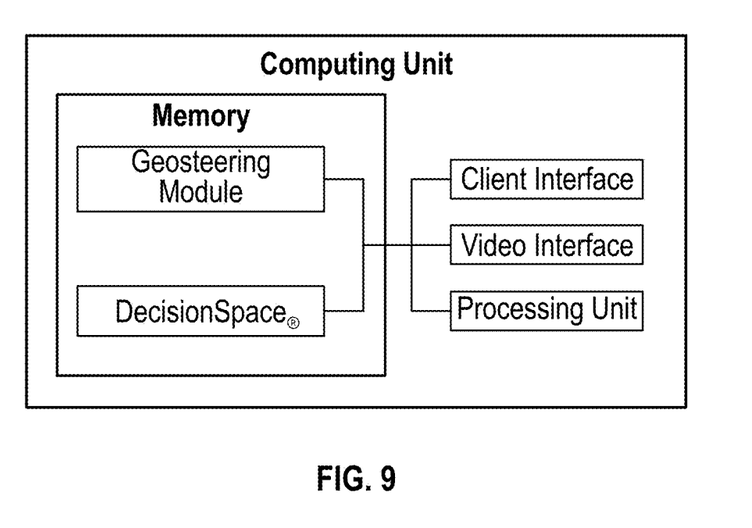
FIG. 9 is a block diagram illustrating one embodiment of a computer system for implementing the present disclosure.

Referring now to FIG. 9, a block diagram illustrates one embodiment of a system for implementing the present disclosure on a computer. The system includes a computing unit, sometimes referred to as a computing system, which contains memory, application programs, a client interface, a video interface, and a processing unit. The computing unit is only one example of a suitable computing environment and is not intended to suggest any limitation as to the scope of use or functionality of the disclosure.

The memory primarily stores the application programs, which may also be described as program modules containing computer-executable instructions, executed by the computing unit for implementing the present disclosure described herein and illustrated in FIGS. 3-8. The memory therefore, includes a geosteering module, which enables steps 308, 322 and 324 described in reference to FIGS. 3A-3B. The geosteering module may integrate functionality from the remaining application programs illustrated in FIG. 9. In particular, DecisionSpace® may be used as an interface application to perform steps 301-306 and 310-320 in FIGS. 3A-3B. Although DecisionSpace® may be used as interface application, other interface applications may be used, instead, or the geosteering module may be used as a stand-alone application.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to, and/or presently being operated on, the processing unit. By way of example, and not limitation, the computing unit includes an operating system, application programs, other program modules, and program data.

The components shown in the memory may also be included in other removable/nonremovable, volatile/nonvolatile computer storage media or they may be implemented in the computing unit through an application program interface ("API") or cloud computing, which may reside on a separate computing unit connected through a computer system or network. For example only, a hard disk drive may read from or write to nonremovable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like. These and other input devices are often connected to the processing unit through the client interface that is coupled to a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well-known.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

The invention claimed is:

1. A method for optimized geosteering using real time geological models, which comprises:
   a) creating a parameter matrix, which comprises a formation property for each pair of true vertical depth (TVD) coordinates from a geological model and measured depth (MD) coordinates from a predefined well trajectory;
   b) initializing the parameter matrix by initializing a value for each parameter entry in the parameter matrix;
   c) updating the initialized parameter matrix by replacing the TVD coordinates and the MD coordinates for each parameter entry in the parameter matrix with the TVD coordinates and the MD coordinates for an actual well trajectory;
   d) compiling a distance to bed boundary (DTBB) array and one or more other logging while drilling (LWD) arrays using corresponding measurements at the MD coordinates of the actual well trajectory;
   e) calculating a value for each parameter entry in the updated parameter matrix, which is a sum of a geology array, the DTBB array and the one or more other LWD arrays that are each multiplied by one of (i) respectively assigned weights when the TVD coordinates and the MD coordinates for each parameter entry in the updated parameter matrix are not located within stratigraphic boundaries of the DTBB array and the one or more other LWD arrays; and (ii) respectively calculated weights when the TVD coordinates and the MD coordinates for each parameter entry in the updated parameter matrix are located within the stratigraphic boundaries of the DTBB array and the one or more other LWD arrays; and
   f) updating the geological model in real time during drilling operations by using a computer processor to replace each initialized value for each parameter entry in the updated parameter matrix with the respective calculated value.

2. The method of claim 1, wherein the geological model is generated using one or more seismic images illustrating formation surfaces and one or more well logs from an offset well.

3. The method of claim 1, wherein the initialized value for each parameter entry in the initialized parameter matrix is calculated as a sum of the geology array, another DTBB array and another one or more other LWD arrays that are each multiplied by one of (i) respectively assigned weights when the TVD coordinates and the MD coordinates for each parameter entry in the updated parameter matrix are not located within the stratigraphic boundaries of the another DTBB array and the another one or more other LWD arrays; and (ii) respectively calculated weights when the TVD coordinates and the MD coordinates for each parameter entry in the updated parameter matrix are located within the stratigraphic boundaries of the another DTBB array and the another one or more other LWD arrays.

4. The method of claim 1, wherein the geology array comprises stratigraphic boundaries and formation properties between the boundaries from the geological model.

5. The method of claim 1, wherein the DTBB array comprises stratigraphic boundaries and formation properties between the boundaries from deep measurements of the formation properties.

6. The method of claim 1, wherein the one or more other LWD arrays each comprise stratigraphic boundaries and formation properties between the boundaries from shallow measurements of the formation property.

7. The method of claim 1, wherein the respectively assigned weights are (1) for the geology array, (0) for the DTBB array and (0) for the one or more other LWD arrays.

8. The method of claim 1, wherein a sum of the respectively calculated weights is equal to 1.

9. A non-transitory computer-readable medium storing instructions that, when executed by a computer, cause the computer to perform a method for optimized geosteering using real time geological models, the method comprising:
  a) creating a parameter matrix, which comprises a formation property for each pair of true vertical depth (TVD) coordinates from a geological model and measured depth (MD) coordinates from a predefined well trajectory;
  b) initializing the parameter matrix by initializing a value for each parameter entry in the parameter matrix;
  c) updating the initialized parameter matrix by replacing the TVD coordinates and the MD coordinates for each parameter entry in the parameter matrix with the TVD coordinates and the MD coordinates for an actual well trajectory;
  d) compiling a distance to bed boundary (DTBB) array and one or more other logging while drilling (LWD) arrays using corresponding measurements at the MD coordinates of the actual well trajectory;
  e) calculating a value for each parameter entry in the updated parameter matrix, which is a sum of a geology array, the DTBB array and the one or more other LWD arrays that are each multiplied by one of (i) respectively assigned weights when the TVD coordinates and the MD coordinates for each parameter entry in the updated parameter matrix are not located within stratigraphic boundaries of the DTBB array and the one or more other LWD arrays; and (ii) respectively calculated weights when the TVD coordinates and the MD coordinates for each parameter entry in the updated parameter matrix are located within the stratigraphic boundaries of the DTBB array and the one or more other LWD arrays; and
  f) updating the geological model in real time during drilling operations by replacing each initialized value for each parameter entry in the updated parameter matrix with the respective calculated value.

10. The non-transitory computer-readable medium of claim 9, wherein the geological model is generated using one or more seismic images illustrating formation surfaces and one or more well logs from an offset well.

11. The non-transitory computer-readable medium of claim 9, wherein the initialized value for each parameter entry in the initialized parameter matrix is calculated as a sum of the geology array, another DTBB array and another one or more other LWD arrays that are each multiplied by one of (i) respectively assigned weights when the TVD coordinates and the MD coordinates for each parameter entry in the updated parameter matrix are not located within the stratigraphic boundaries of the another DTBB array and the another one or more other LWD arrays; and (ii) respectively calculated weights when the TVD coordinates and the MD coordinates for each parameter entry in the updated parameter matrix are located within the stratigraphic boundaries of the another DTBB array and the another one or more other LWD arrays.

12. The non-transitory computer-readable medium of claim 9, wherein the geology array comprises stratigraphic boundaries and formation properties between the boundaries from the geological model.

13. The non-transitory computer-readable medium of claim 9, wherein the DTBB array comprises stratigraphic boundaries and formation properties between the boundaries from deep measurements of the formation properties.

14. The non-transitory computer-readable medium of claim 9, wherein the one or more other LWD arrays each comprise stratigraphic boundaries and formation properties between the boundaries from shallow measurements of the formation property.

15. The non-transitory computer-readable medium of claim 9, wherein the respectively assigned weights are (1) for the geology array, (0) for the DTBB array and (0) for the one or more other LWD arrays.

16. The non-transitory computer-readable medium of claim 9, wherein a sum of the respectively calculated weights is equal to 1.

17. A non-transitory computer-readable medium storing instructions that, when executed by a computer, cause the computer to perform a method for optimized geosteering using real time geological models, the method comprising:
  a) creating a parameter matrix, which comprises a formation property for each pair of true vertical depth (TVD) coordinates from a geological model and measured depth (MD) coordinates from a predefined well trajectory;
  b) initializing the parameter matrix by initializing a value for each parameter entry in the parameter matrix;
  c) updating the initialized parameter matrix by replacing the TVD coordinates and the MD coordinates for each parameter entry in the parameter matrix with the TVD coordinates and the MD coordinates for an actual well trajectory;
  d) compiling a distance to bed boundary (DTBB) array and one or more other logging while drilling (LWD) arrays using corresponding measurements at the MD coordinates of the actual well trajectory;
  e) calculating a value for each parameter entry in the updated parameter matrix, which is a sum of a geology array, the DTBB array and the one or more other LWD arrays that are each multiplied by respective weights;
  f) updating the geological model in real time during drilling operations by replacing each initialized value for each parameter entry in the updated parameter matrix with the respective calculated value;
  g) adjusting the actual well trajectory during drilling operations based on the updated geological model; and h) repeating steps c) g) until the drilling operations have reached a reservoir and the actual well trajectory is optimized, wherein the initialized value for each parameter entry in the initialized parameter matrix is calculated as a sum of the geology array, another DTBB array and another one or more other LWD arrays that are each multiplied by one of (i) respectively assigned weights when the TVD coordinates and the MD coordinates for each parameter entry in the updated parameter matrix are not located within stratigraphic boundaries of the another DTBB array and the another one or more other LWD arrays; and (ii) respectively calculated weights when the TVD coordinates and the MD coordinates for each parameter entry in the updated parameter matrix are located within the stratigraphic boundaries of the another DTBB array and the another one or more other LWD arrays.

* * * * *